(12) United States Patent
Keller

(10) Patent No.: US 6,578,738 B1
(45) Date of Patent: Jun. 17, 2003

(54) THIN WALL PACKAGE FOR USE WITHIN A REUSABLE CARTRIDGE

(76) Inventor: Wilhelm A. Keller, Obstgartenweg 9, CH-6402 Merlischachen (CH)

(*) Notice: Subject to any disclaimer, the term of this patent is extended or adjusted under 35 U.S.C. 154(b) by 0 days.

(21) Appl. No.: 09/821,467
(22) PCT Filed: Oct. 8, 1999
(86) PCT No.: PCT/EP99/07558
§ 371 (c)(1), (2), (4) Date: Apr. 9, 2001
(87) PCT Pub. No.: WO00/21858
PCT Pub. Date: Apr. 20, 2000

(30) Foreign Application Priority Data
Oct. 9, 1998 (EP) .............................................. 98811014

(51) Int. Cl.[7] .............................................. B65D 35/28
(52) U.S. Cl. .......................... 222/83; 222/95; 222/105; 222/145.5; 222/326
(58) Field of Search .................... 222/83, 95, 105, 222/136, 137, 145.5, 145.6, 326, 327, 386

(56) References Cited

U.S. PATENT DOCUMENTS

| | | | | |
|---|---|---|---|---|
| 3,552,607 A | * | 1/1971 | Edwards et al. ............. | 222/566 |
| 4,469,250 A | * | 9/1984 | Evezich ....................... | 222/83.5 |
| 5,033,631 A | * | 7/1991 | Nightingale ................. | 222/105 |
| 5,037,002 A | * | 8/1991 | Tschanen .................... | 222/105 |
| 5,118,003 A | * | 6/1992 | Pepper et al. ............... | 222/105 |
| 5,135,137 A | * | 8/1992 | Rudick ........................ | 222/105 |
| 5,332,122 A | | 7/1994 | Herold et al. ............... | 222/105 |
| 5,501,368 A | | 3/1996 | Brandhorst et al. .......... | 222/95 |
| 5,647,510 A | | 7/1997 | Keller ......................... | 222/94 |
| 5,699,935 A | * | 12/1997 | Stahley ....................... | 222/105 |

FOREIGN PATENT DOCUMENTS

| | | |
|---|---|---|
| EP | 0 541 972 | 5/1993 |
| EP | 0 693 437 | 1/1996 |
| EP | 0 855 349 | 7/1998 |
| FR | 1 162 955 | 9/1958 |
| FR | 2 067 177 | 8/1971 |
| FR | 2 411 140 | 7/1979 |
| FR | 2 483 881 | 12/1981 |

* cited by examiner

Primary Examiner—Joseph A. Kaufman
(74) Attorney, Agent, or Firm—Foley & Lardner

(57) ABSTRACT

A package assembly is provided for use within a reusable cartridge for dispensing at least one component. The package assembly includes a container with a thin, flexible membrane wall with an open end, and a front outlet to which the open end of the membrane container is secured by a ring-shaped sealing element. This membrane container outlet end allows conventional filling of the container and a perfect seal at the front outlet.

22 Claims, 7 Drawing Sheets

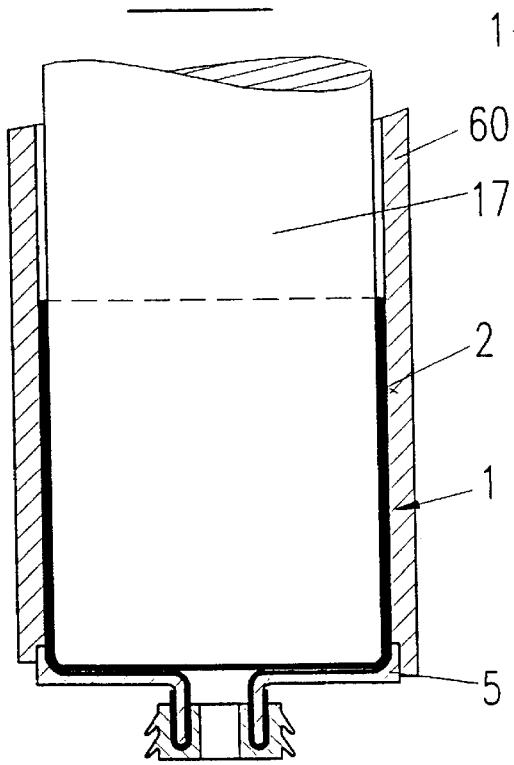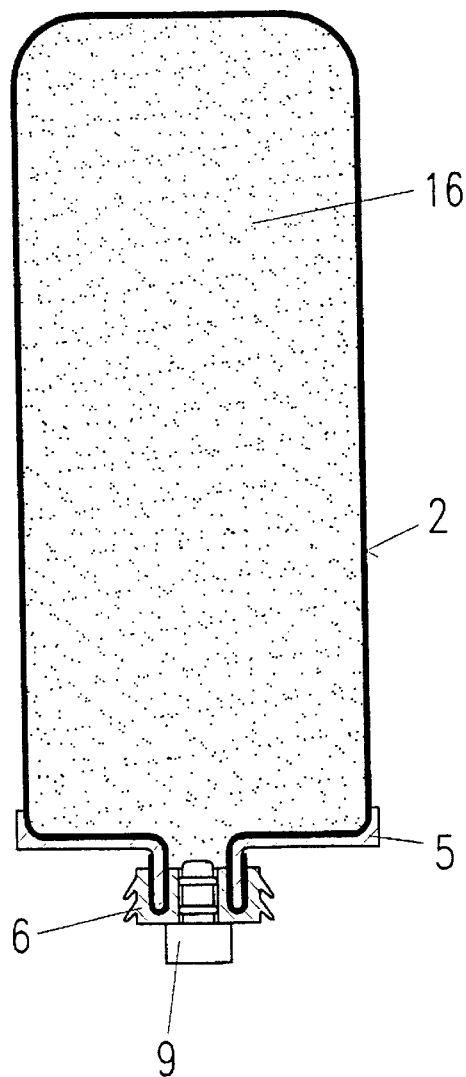

THIN WALL PACKAGE FOR USE WITHIN A REUSABLE CARTRIDGE

CROSS-REFERENCE TO RELATED PATENT APPLICATIONS

This application is a US national stage application of PCT Application PCT//EP99/07558, filed Oct. 8, 1999, claiming priority to European Application EP 988 11 014.4, filed Oct. 9, 1998.

BACKGROUND OF THE INVENTION

The use of two component cartridge systems is well known for the storage, metering and mixing of two component reactive chemical systems such as epoxies, polyurethanes, acrylics, silicones, polysulfides and polyesters. It is also well known that, for environmental reasons, cartridge systems including sausage type packages with thin plastic/foil laminate membrane walls are used to contain such chemicals. These packages are fitted within and supported by a cartridge like structure while the contents are dispensed. When depleted, the sausage type packages may be disposed of, while the whole (or majority) of the supporting cartridge structure can be reused.

It is within this field of sausage type package use that certain problems are seen to arise. For example, U.S. Pat. Nos. 5,332,122 and 5,501,368 teach containers for flowable substances. These containers require packages fabricated from flexible plastic foil/laminate sheets. For a given package, the flexible plastic foil/laminate sheet is folded to form a tube and then partially overlapped and welded together such that, along the weld length, the now double layer seam is thicker and less flexible than the rest of the package wall and is subject to potential leakage due to weld failure. Moreover, the aforementioned container tube fabrication takes place as the first stage of a complex and continuous fabrication, filling and closing process, the process continues after the initial closing of the tube with the immediate chemical filling of the tube as the second stage. The third stage involves the dividing off and closing of the, now, filled tube into volumetrically controlled lengths. At the division points, the filled tube diameter is reduced all the way to the tube axis, which results in considerable wrinkling of the tube wall prior to being closed by a crimped ring. Such crimped ring closures often fail to achieve an effective seal due to the incompressibility of the membrane and of the wrinkled overlaps which, themselves, tend to form leak paths under pressure. For the same reasons, the necessary sealing of the wrinkled tube wall against a front outlet is another failure area.

In addition, at a time just prior to the package use and after it has been placed within a reusable cartridge support structure, the package outlet end must be opened. This is done by cutting behind the crimped ring closure of the package. This opening of the package outlet end allows the package to settle within the reusable cartridge, adjusting its outer shape to conform to that of the internal diameter of the supporting structure. In doing so, air is induced into the package, particularly with lower viscosity chemicals. Thus, as air within a metering package causes the content to be non-hydraulic and therefore compressible, both the start and the stop of each of the two metered flows go out of synchronization relative to each other, which can result in an "off ratio" mixture when being processed through a static mixer. Furthermore, at the end of the discharge stroke, this can also lead to an unacceptable residual volume of chemical left within the center of the collapsed package due to incomplete compaction as a result of the membrane having been scraped off the outer supporting structure wall, folded and compacted in a more or less ring shaped fashion.

Alternatively, if a fabricated membrane container with a longitudinal seam is used for a package, problems arise in particular at the outlet of the package. One proposal, according to U.S. Pat. No. 5,647,510, provides, at the outlet end, an outlet piece to which the straight end of the membrane container wall is adhered. This adhesion process, however, is difficult to achieve in a leak proof and reliable fashion.

SUMMARY OF THE INVENTION

Starting from the aforementioned prior art, it is an object of the present invention to provide a thin wall membrane package which overcomes the above mentioned drawbacks, and provides a proper sealing and closure of the outlet end.

A further object is to avoid the problems arising from the fabricated sausage type package with longitudinal seams and a rear end closure. Thus, according to one aspect of the present invention, a package assembly is provided including an integrally formed, uniform and seamless thin flexible membrane wall container so as to avoid any chance of seam joint or rear end closure failure.

A further object is to provide for a package with easy handling and assembling properties and which improves, in particular, the attachment of a dynamic mixer.

Above all, another aspect of the present invention is directed at improving and/or eliminating the highly complex and necessarily combined fabrication and filling process, which entails high initial capital investment and is only economically viable for long production runs that can absorb the high "setting up" costs prior to each production run. Hence, an environmentally advantageous package is proposed with the major advantages of being fillable by existing conventional cartridge filling methods, yet avoiding the entrapment of air within the liquid chemical content.

BRIEF DESCRIPTION OF THE DRAWINGS

Preferred embodiments of the invention will now be described in detail by reference to the accompanying drawing. Wherever possible, the same reference numbers will be used throughout the drawings to refer to the same or like parts.

FIG. 3 shows the package of FIG. 1 prior to filling;

FIG. 4 shows the package of FIG. 3 after filling;

DETAILED DESCRIPTION OF PREFERRED EMBODIMENTS

Figure 1:
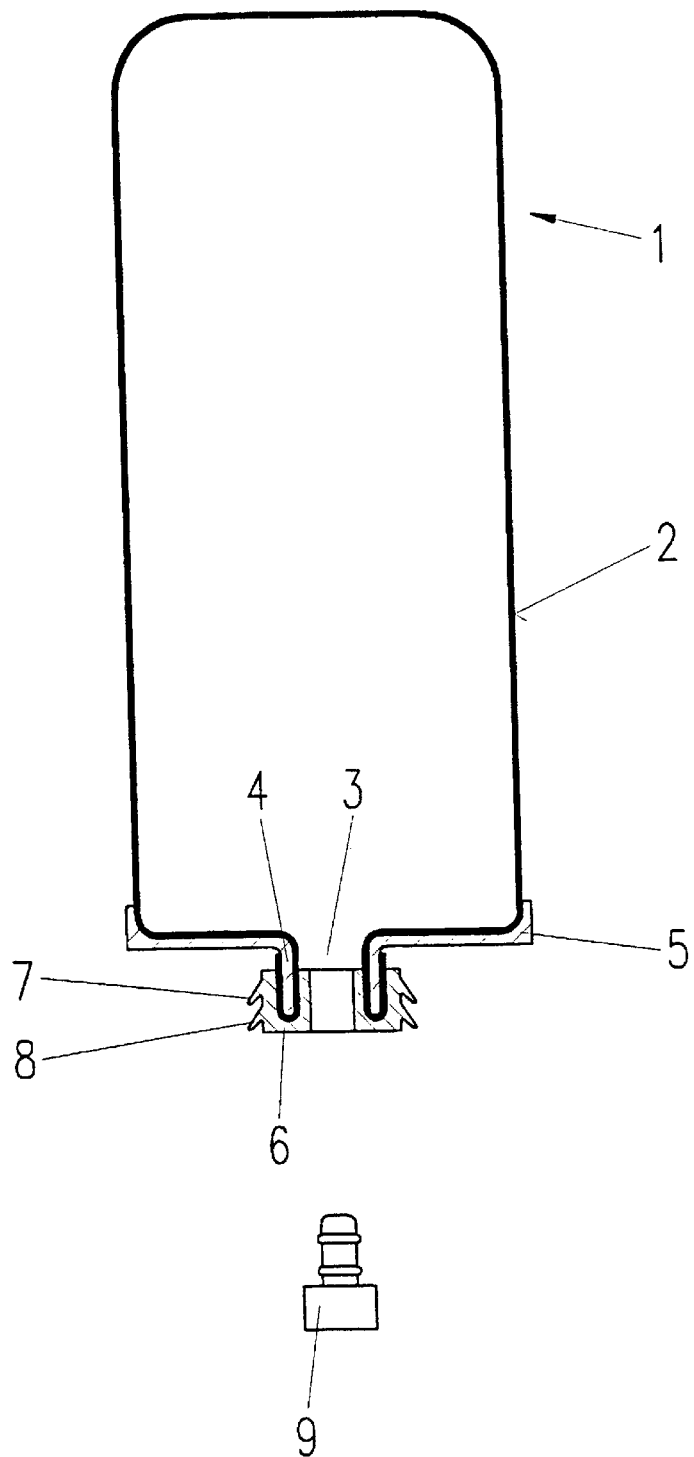
FIG. 1 shows a longitudinal cross-section of a package according to a first embodiment of the invention.

FIG. 1 shows a longitudinal cross-section of a bottle shaped package assembly 1 having an integrally formed and seamless thin flexible wall 2 with an open neck end 3 passing through the inside of the tube 4 of a front outlet 5, the flexible wall 2 being folded back over the front outside diameter of that tube 4. A sealing ring 6, with lips 7 and 8 for sealing against the cartridge outlet, is fitted over the flexible wall 2 on the inside and outside of the tube 4, the sealing ring 6 being formed to receive a separate sealing plug 9.

It follows from the above that the package is made bottle shaped so as to essentially match the internal shape of a supporting structure before its insertion, such that it minimizes the necessary adjustment of the external shape of the package to that of the supporting structure which could otherwise lead to air induction into the package when the package is inserted inside the supporting structure and opened prior to dispensing. Furthermore, in comparison with the "state of the art" package which has two closed off ends, this aspect of the invention proposes a package assembly with only one closable open neck end, the open neck end having a reduced diameter with the advantage of the entire package wall having no wrinkles whatsoever.

Figure 2:
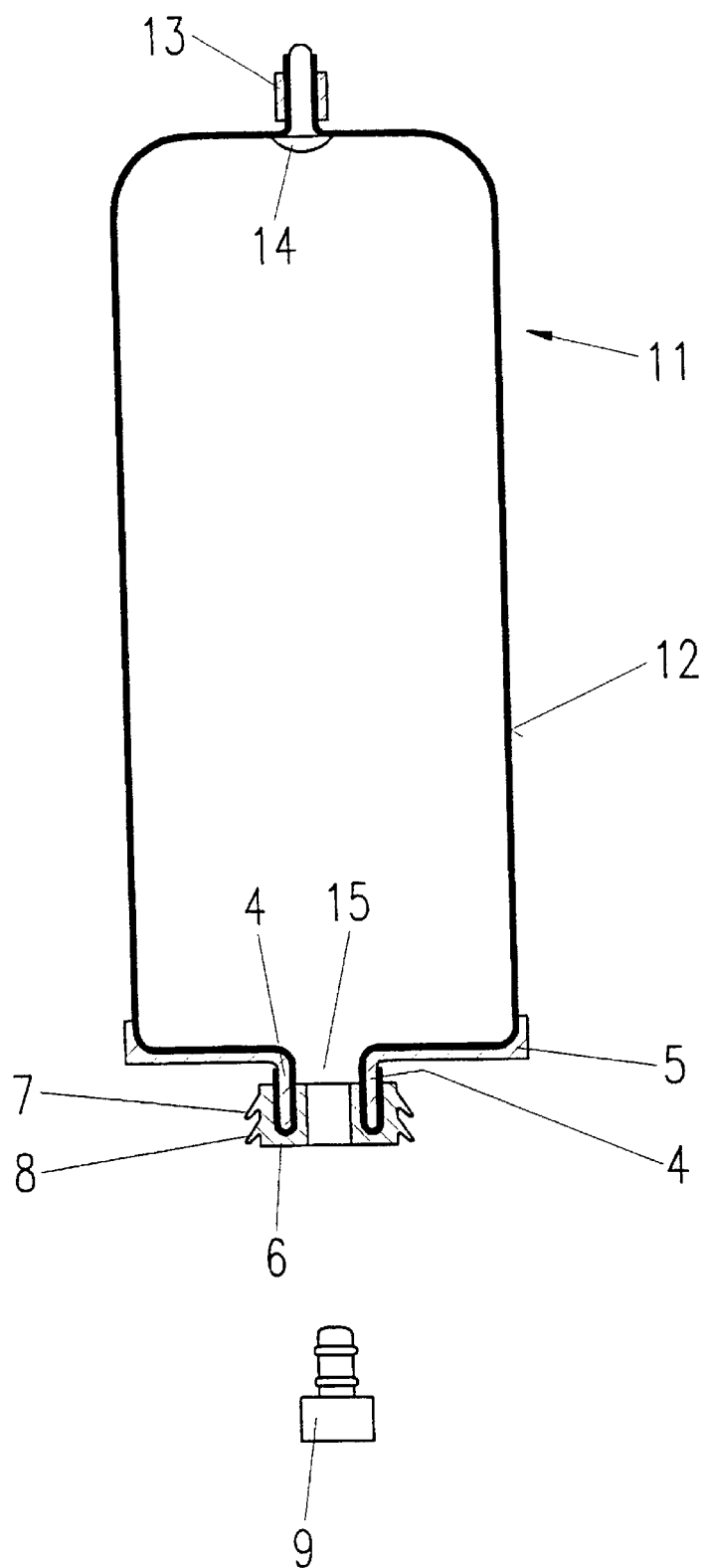
FIG. 2 shows a longitudinal cross-section of a package according to a second embodiment of the invention.

Another aspect of the invention for a fabricated sausage type package according to FIG. 2, proposes the use of a compressible plug, rod or mushroom like device held within the closed wrinkled wall end such that the closure means, for instance a crimped ring, creates and maintains a compressive tension, the compressible device itself acting as an expanding and self adjusting sealing bung.

FIG. 2 shows a longitudinal cross-section of a package assembly 11 having a fabricated thin flexible wall 12 with two open ends, one being closed by a crimped ring 13 against a central compressible mushroom shaped device 14. At the front of the package assembly 11, the open neck end 15 passes through the inside of the tube 4 of the front outlet 5 and is folded back over the front outside of tube 4 with a sealing ring fitted as similarly shown in FIG. 1.

According to the characteristics of the chemicals to be stored in the containers, the membrane container wall comprises one or more layers of the same material or of different materials.

FIG. 3 shows a longitudinal cross-section of a bottle shaped package assembly 1, as shown in FIG. 1, with the rear part of the flexible membrane wall 2 having been folded over within itself and "outside-in" down to the inside of the front outlet 5 by a plunger 17. This collapsed bottle shaped package within a rigid structure 60 is thus now ready for filling, the air previously contained within the package assembly having been evacuated by vacuum.

FIG. 4 shows a longitudinal cross-section of the same package assembly 1 as in FIG. 3 but after filling with chemical 16, and plugging.

Figure 5:
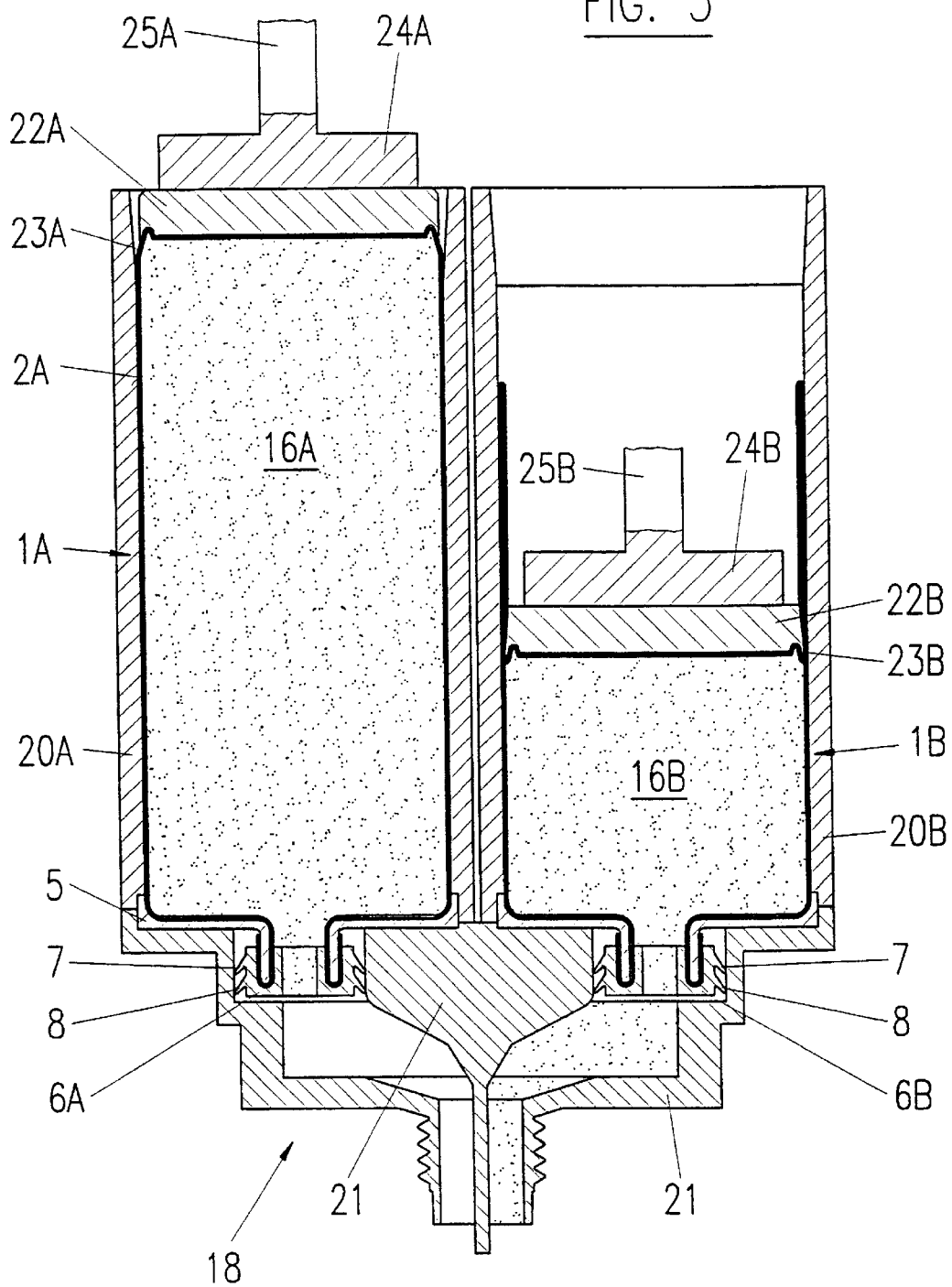
FIG. 5 shows a longitudinal cross-section of a cartridge assembly with two packages of FIG. 4 in two different stages of dispensing.

FIG. 5 shows a longitudinal cross-section of a cartridge assembly 18 which retains package assemblies 1A and 1B with chemical contents 16A, 16B within cylinders 20A, 20B and sealing those package assemblies 1A and 1B against cartridge outlet 21 via the sealing means 6A, 6B and lips 7, 8. Package assembly 1A is shown with the driven piston 22A, with lip 23A, attached to the back of the package assembly 1A and drive plunger 24A, with drive rod 25A, ready for forward movement. Package assembly 1B is shown in a partly dispensed state with the driven piston 22B, with lip 23B, having been pushed down within the cylinder 20B by the drive plunger 24B and drive rod 25B such that the package assembly 1B has been turned "outside in" within itself while displacing the chemical content 16B via the cartridge outlet 21.

Figure 6:
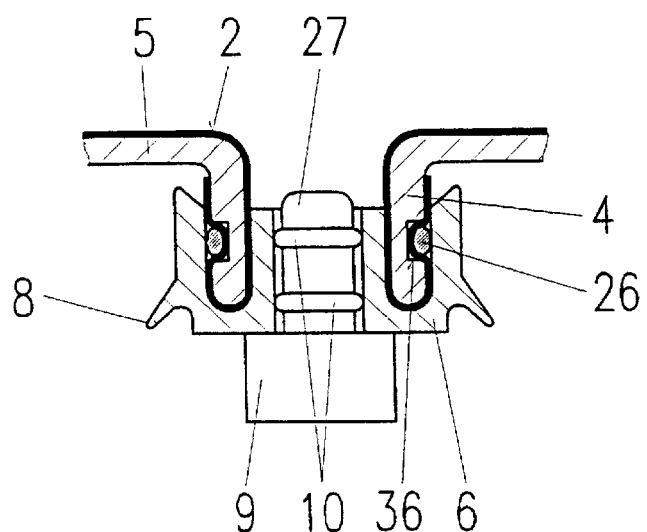
FIGS. 6–8 each show a longitudinal cross-section of three different package assembly closures according to various embodiments of the present invention.

FIG. 6 shows a longitudinal cross-section of a variation of a package assembly closure embodiment in the form of a package assembly sealing ring 6, serving as a retaining means for the sealing and securing means of the membrane in the form of an O-ring 26 on the outside diameter of tube 4 which is provided with a groove 36. The retaining ring 6 is also provided with a single sealing lip 8 and is closed off by a sealing plug 9.

Figure 7:
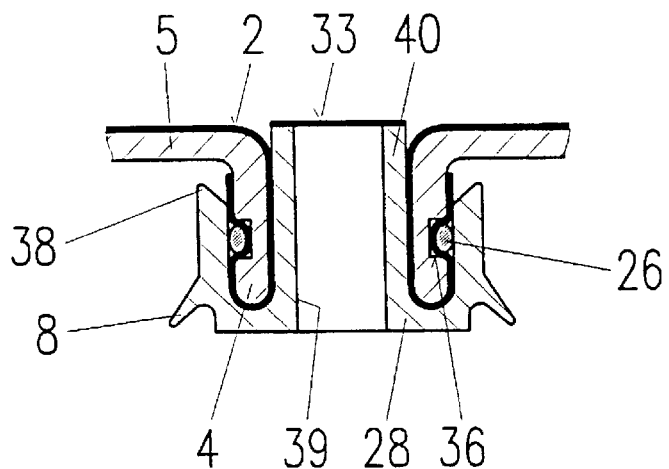

FIG. 7 shows a similar package assembly closure embodiment as FIG. 6, with the exception of the inner part 39 of sealing ring 28 having an attached burstable or pierceable diaphragm 33. It is evident that the sealing and securing O-ring stands for any appropriate sealing element.

Figure 8:
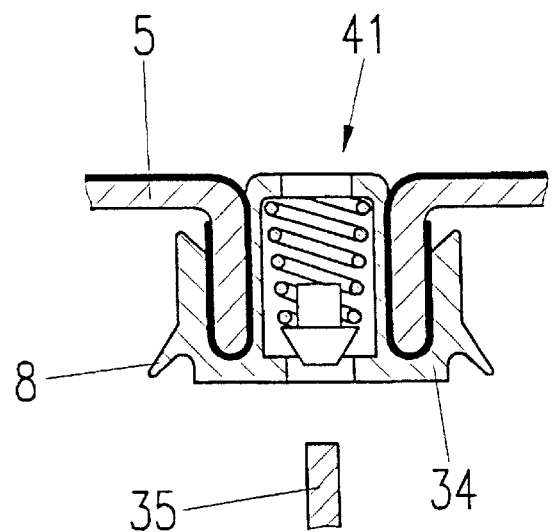

FIG. 8 shows a longitudinal cross-section of a variation of the package assembly closure embodiment of FIG. 6, in the form of a sealing ring 34 incorporating a spring loaded valve 41 which facilitates air free filling of the package and is opened by a pin 35 attached to the cartridge outlet.

Figure 9:
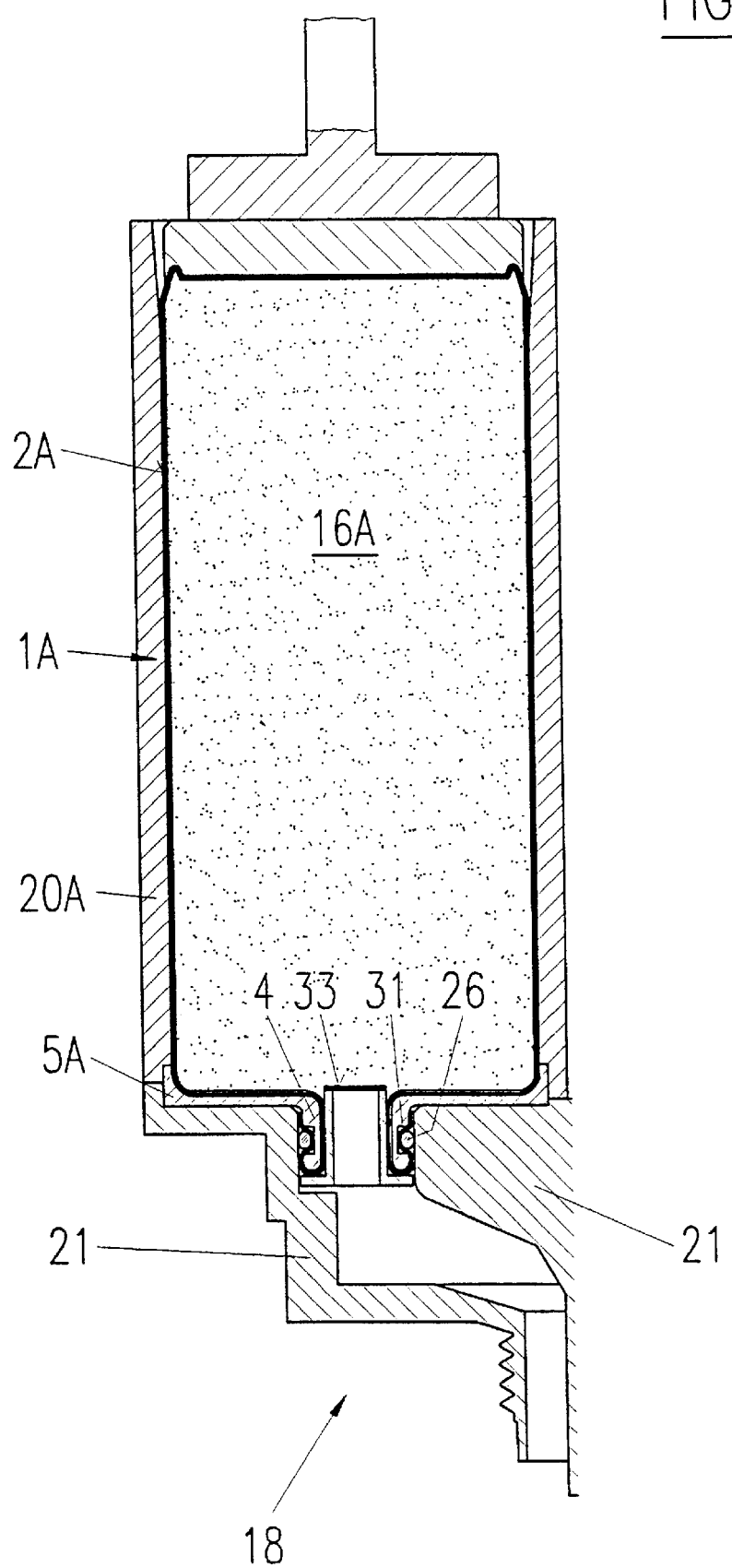
FIG. 9 shows a variant of the cartridge assembly of FIG. 5 according to an embodiment of the present invention.

FIG. 9 shows one side only of a longitudinal cross-section of a cartridge assembly 18 similar to that shown in FIG. 5, in that it retains the package assembly 1A with chemical contents 16A within cylinder 20A but with the variation that the neck of the membrane 2A is sealed and secured on the outside of the tube 4 of the front outlet 5A by O-ring 26 within an external groove 31, the O-ring 26 being compressed against the cartridge outlet 21 so as to form a ring sealing means between that cartridge outlet 21 and the membrane 2A. Also, the inside of the tube 4 is fitted with a closure having a burstable diaphragm 33 as shown in FIG. 7.

Figure 10:
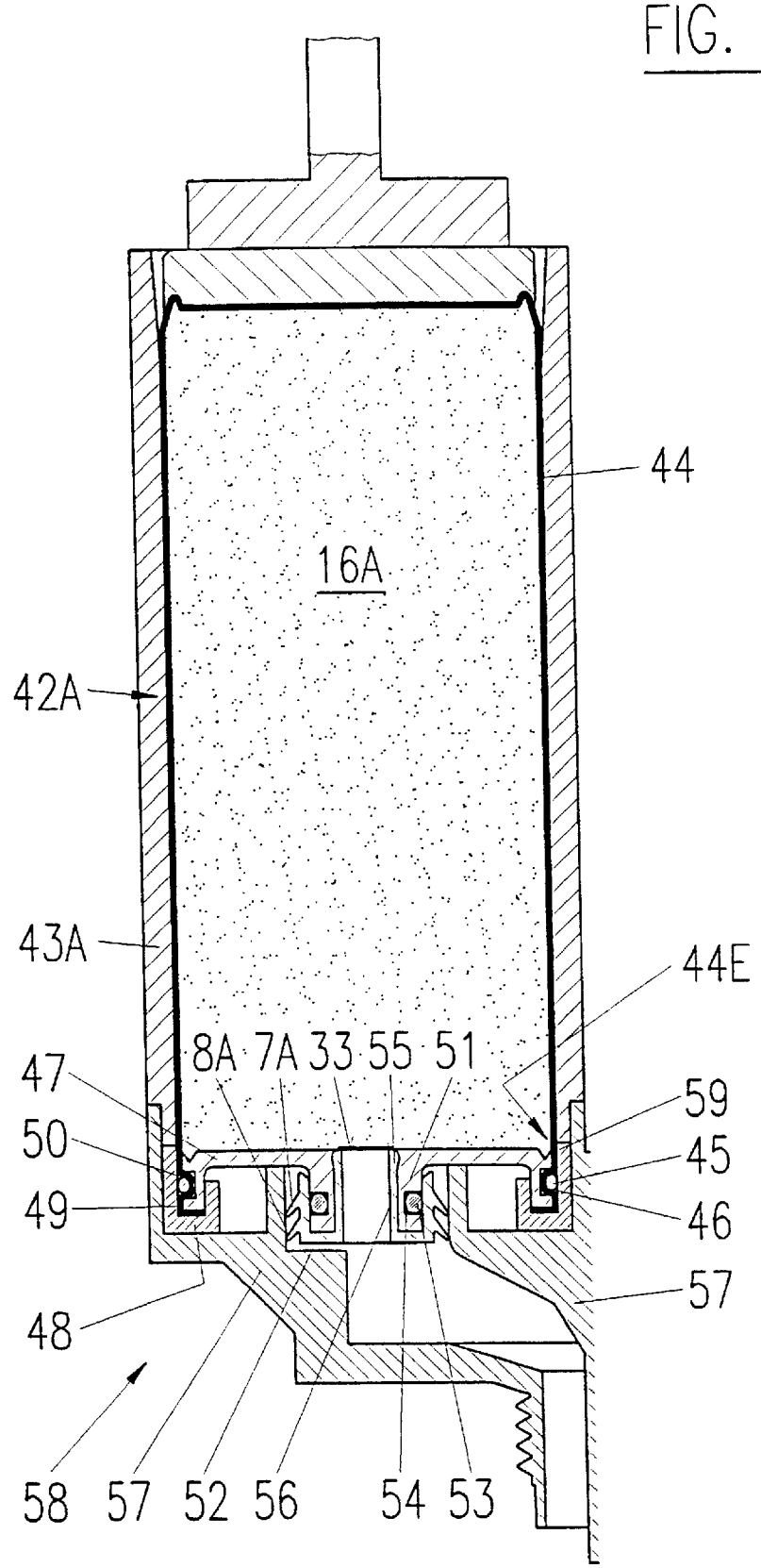
FIG. 10 shows another cartridge assembly according to an embodiment of the present invention.

FIG. 10 shows a longitudinal cross-section of one side of a cartridge assembly 58 which retains package assembly 42A with chemical contents 16A within the cartridge cylinder 43A, the full diameter outlet end of container membrane 44 being secured and sealed between O-ring 45 and the O-ring groove 46 within the outer periphery 49 of the front outlet 47, the securing O-ring 45 being retained by the retaining ring 48 against the outer periphery of the front outlet 47. In addition, under operating conditions, the wall 44E of the membrane 44 is further sealed by the action of the pressure actuated lip 59. Lip 59 can either press on the outlet end of cartridge cylinder wall 43A or on its continuation, the wall of retaining ring 48.

The tube 51 of the front outlet 47 is closed by sealing ring 52 via O-ring 53 in groove 54, the end 55 of the inner part 56 of sealing ring 52 having a burstable diaphragm 33 attached. The package assembly 42A is shown sealed against the cartridge outlet 57 via the sealing ring means 52 with lips 7A, 8A.

It follows that a sealed outlet closure is achieved regardless of whether the flexible membrane wall is seamless or not, or whether the container is bottle-shaped or not. The proposed method and the closure means allow also the filling of the container without any air inclusion.

The embodiments of FIGS. 5, 9 and 10 all show a cartridge outlet 21 or 57 made in one piece, to which the individual front outlets 5, 5A, or 47 respectively are attached. This improves the handling and the assembly of such packages considerably, and also enables the easy use of, and attachment of a dynamic mixer.

The embodiment with a sealing ring incorporating a spring loaded valve facilitates the container to be collapsed and evacuated, to maintain evacuation prior to air free filling, to maintain the filled condition without leakage, and allows for trouble free insertion into the supporting cartridge structure and connection to the cartridge outlet prior to use.

What is claimed is:

1. A reusable cartridge assembly for dispensing at least one component, comprising:
   at least one cartridge cylinder having a rigid wall;
   a cartridge outlet;
   a package assembly comprised of:
      a container having a flexible membrane wall with an open end and a closed end;
      a front outlet to which the open end of the flexible membrane wall is secured; and
      a ring-shaped sealing element for sealing the open end of the flexible membrane wall with said front outlet; and
   a driven piston for dispensing said at least one component from said container via said cartridge outlet,
   wherein the closed end of the flexible membrane wall includes a compressible plug at its center and a first closure element over an outer diameter of the compressible plug.

2. A reusable cartridge assembly for dispensing at least one component, comprising:
   at least one cartridge cylinder having a rigid wall;
   a cartridge outlet; and
   a package assembly comprised of:
      a container having a flexible membrane wall with an open end and a closed end;
      a front outlet to which the open end of the flexible membrane wall is secured; and
      a ring-shaped sealing element for sealing the open end of the flexible membrane wall with said front outlet,
   wherein the closed end of the flexible membrane wall includes a compressible plug at its center and a first closure element over an outer diameter of the compressible plug.

3. A cartridge assembly according to claim 2, wherein the container includes an open neck end, the external shape of which essentially matches the internal shape of a supporting structure.

4. A cartridge assembly according to claim 3, wherein the container is bottle shaped and includes a second closure element for sealing the open neck end.

5. A cartridge assembly according to claim 3, wherein the front outlet comprises a tube, and wherein the ring shaped sealing element is fitted around an outlet end of the tube for attaching and sealing the open neck end.

6. A cartridge assembly according to claim 2, wherein the open end of the flexible membrane wall is secured in a groove at an outer diameter of the front outlet by one of the ring-shaped sealing element and a bore of the cartridge outlet.

7. A cartridge assembly according to claim 2, wherein the open end of the flexible membrane wall is secured in a groove at a periphery of the front outlet by the ring-shaped sealing element.

8. A cartridge assembly according to claim 7, wherein the front outlet comprises a sealing lip, sealing the flexible membrane wall against one of the rigid wall of the at least one cartridge cylinder and the ring-shaped sealing element.

9. A cartridge assembly according to claim 7, wherein the front outlet comprises a tube and a sealing ring fitted around the tube, and wherein the package assembly further comprises a closure element for sealing said tube.

10. A cartridge assembly according to claim 9, wherein the sealing ring is provided with at least one sealing lip at its outer diameter.

11. A cartridge assembly according to claim 2, further comprising a second closure element for sealing said front outlet, said second closure element including one of a burstable and a pierceable diaphragm.

12. A cartridge assembly according to claim 2, wherein a second closure element comprises a sealing plug.

13. A cartridge assembly according to claim 2, wherein a second closure element comprises a self closing valve.

14. A cartridge assembly according to claim 13, wherein the cartridge outlet comprises a pin for opening the self closing valve.

15. A cartridge assembly according to claim 2, wherein the compressible plug has an increased diameter on at least one end.

16. A cartridge assembly according to claim 2, wherein the cartridge outlet is made in one piece for receiving the front outlet of the package assembly.

17. A cartridge assembly according to claim 2, wherein sealing lips formed on the ring-shaped sealing element are sealed within a bore of the cartridge outlet.

18. A cartridge assembly according to claim 2, wherein a driven piston is arranged within the cartridge cylinder such that the container is turned "outside in" by action of the driven piston.

19. A method for filling the reusable cartridge assembly according to claim 2, comprising: prior to filling, folding a rear part of the flexible membrane wall over within itself; applying a vacuum at the open end of the flexible membrane wall for complete air evacuation; filling the container with the at least one component free of air; and closing the container with the first closure element.

20. The cartridge assembly according to claim 21, wherein the flexible membrane wall of the container is integrally formed and seamless.

21. A cartridge assembly for dispensing at least one component, comprising:
   a cartridge;
   a package assembly adapted to be positioned substantially within said cartridge, said package assembly being comprised of:
      a flexible container having an open end and a closed end;
      a front outlet to which the open end of the flexible container is secured; and
      a compressible plug formed on the closed end of the flexible container; and
      a closure element engaging an outer diameter of the compressible plug.

22. The cartridge assembly according to claim 21, wherein the compressible plug has an increased diameter on at least one end.

* * * * *

UNITED STATES PATENT AND TRADEMARK OFFICE
CERTIFICATE OF CORRECTION

PATENT NO. : 6,578,738 B1
DATED : June 17, 2003
INVENTOR(S) : Wilhelm A. Keller

It is certified that error appears in the above-identified patent and that said Letters Patent is hereby corrected as shown below:

<u>Column 6,</u>
Line 39, replace "21" with -- 2 --.

Signed and Sealed this

Sixteenth Day of December, 2003

JAMES E. ROGAN
*Director of the United States Patent and Trademark Office*